Figure 1:
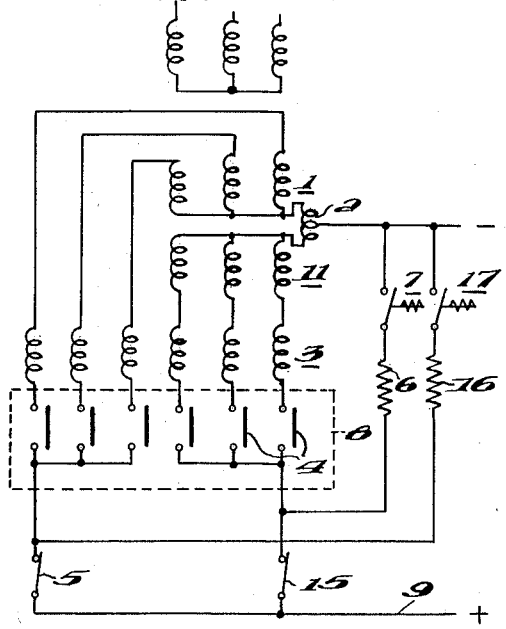

Dec. 20, 1960     H. BLATTER     2,965,831
BASE LOAD CIRCUIT FOR CONTACT CONVERTER APPARATUS
Filed Nov. 19, 1957     2 Sheets-Sheet 1

INVENTOR
HANS BLATTER

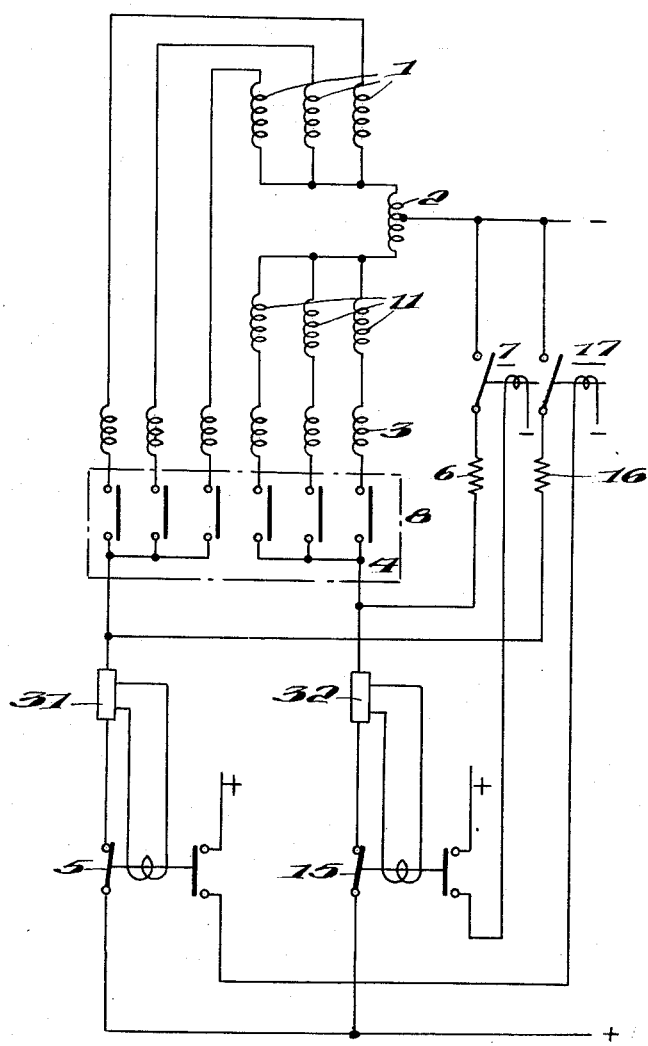

United States Patent Office 2,965,831
Patented Dec. 20, 1960

2,965,831

BASE LOAD CIRCUIT FOR CONTACT CONVERTER APPARATUS

Hans Blatter, Wettingen, Switzerland, assignor to Aktiengesellschaft Brown, Boveri & Cie., Baden, Switzerland, a joint-stock company Filed Nov. 19, 1957, Ser. No. 697,440

Claims priority, application Switzerland Nov. 22, 1956

5 Claims. (Cl. 321—48)

In rectifier and contact converter systems which are fed from a multi-phase network over transformers with inter-phase transformers, there are formed several independent groups which—depending on the wiring of the secondary winding—have different phase numbers and are phase-displaced in relation to each other. Thus one may obtain two three-phase groups which are connected in parallel over an inter-phase transformer. Separately, the two groups have the effect of being three-phase; in the total arrangement, six-phase. In this instance the firing period is 120°, despite the six-phase effect. A similar effect results from a division into three groups, where three-phase star-connected inter-phase transformers must be used and three two-phase groups are formed, each of which has a firing period of 180°.

In such arrangements, however, the proper operation is insured only as long as the necessary magnetizing current flows in the inter-phase transformer. If the load current is smaller than the magnetizing current, the inter-phase transformer is no longer operative and the firing period in rectifiers is reduced to 60°. The effect of this is that at small currents the voltage increases suddenly (so-called choke coil inflection). In contact converters there is the additional disadvantage that the reduction of the firing period does not occur automatically, but must be effected by the control. For this reason a complicated control device is required.

In the previously known models this has been avoided in that there was provided a base load resistance which either was connected permanently or was automatically connected when the load dropped or failed. This resistance had to be so proportioned that its by-pass current was at least equal to the magnetizing current of the inter-phase transformer: for reasons of safety, it usually would be proportioned somewhat higher. Normally, the magnetizing current is about 5% of the rated current of the converter. This results in a relatively high output for the base load resistance. At the smallest possible voltage of $U_{min}$ it has the value:

$$R \text{ equals } \frac{U_{min}}{0.05 I_n} \text{ (ohm)}$$

At the greatest possible voltage of $U_{max}$ it would then have to withstand a steady current strength of $$I_{max} \text{ equals } U_{max}/U_{min} \; 0.05 \; I_n \text{ (ohm)}$$

Already at the voltage ratio of 1:2 the resistance would have to be designed for 10% of the rated current. Often, however, the difference between the highest and lowest voltages is still greater, so that the input of the base load resistance becomes still greater.

This disadvantage can be considerably reduced only by the application of the principles of the present invention.

According to the invention, each group is loaded by a separate base load resistance on the D.C. side, with the D.C. switch open. It then suffices for the resistance to be designed on the basis of the saturation current of the switch choke coils used in contact converters, rather than on the basis of the magnetizing current of the inter-phase transformer.

In this manner the groups are not connected together on idling and can be run separately, that is, they maintain the same contact closing period during idling which they have at higher load. Therefore no complicated control devices are necessary; moreover, the base load resistances need to carry only the saturation current of the switch choke coil, which is about 5 a. regardless of the load. The advantage is the more evident the greater the rated current of the system. For example, at a rated current of 20,000 a. the base load resistance may be designed for only the 200th part, assuming again a voltage ratio of 1:2. The resistance then is:

$$R \text{ equals } U_{min}/5 \text{ (ohm)}$$

The permissible current then is:

$$I_{max} \text{ equals } \frac{U_{max}}{U_{min}} \times 5 \text{ (a.) at } U_{max}/U_{min} \text{ equals } 2$$

that is, 10 a., as against 2000 a. for the known wiring.

All that is necessary for this arrangement is to separate the two groups by D.C. switches during idling. This can be done so that each group has its own D.C. switch, it being possible to install the switches in the D.C. line of each group. As an alternative, the D.C. switches may be provided between the neutral wire of the transformer secondary winding and the inter-phase transformer or in the neutral point junction of the inter-phase transformer.

Another improvement consists in disconnecting the D.C. switches and connecting the base load resistances upon removal of the load from the machine when the load current drops to about the magnetizing current of the inter-phase transformer. This arrangement, too, affords the possibility of connecting the base load resistance and disconnecting the D.C. switch only in one group, while leaving the load connected to the other group. This makes it possible to continue feeding loads which carry smaller currents than the magnetizing current of the inter-phase transformer.

The entire arrangement can be used in two- and three-phase inter-phase transformer wirings.

Figures 2, 3:
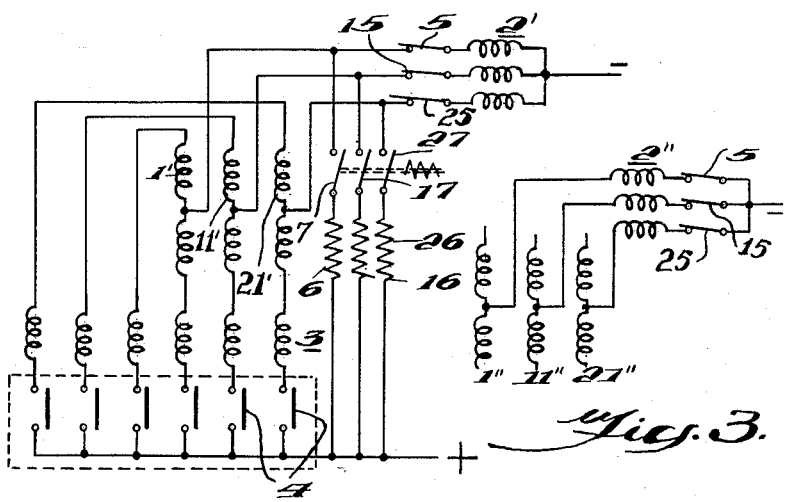

The inventive idea is explained further in Figures 1 to 4 of the accompanying drawings. Fig. 1 illustrates the wiring with the D.C. switches in the D.C. lines of each group in a two-phase inter-phase transformer; Fig. 2 shows an arrangement of the D.C. switches between the neutral point of the secondary windings and the inter-phase transformer, which is here designed as a three-phase coil; Fig. 3 shows an arrangement with D.C. switches in the star point of the inter-phase transformer; and Fig. 4 illustrates a modification of the arrangement of Fig. 1 wherein the D.C. switches are disconnected and the base load resistances are connected when the load current drops to the magnetizing current of the inter-phase transformer. In Fig. 1, 1 and 11 denote the two groups of the transformer secondary windings. 2 is the inter-phase transformer, which connects both groups of secondary windings. 3 denotes the switch choke coils, which produce the light-current interval during commutation. Their performance is not further described here, as the same is not a part of the inventive idea. At 4 are denoted the contacts of the contact converter 8, these being divided again into two groups which have two separate D.C. switches 5 and 15 in the leads to a D.C. bus bar 9. To these leads are connected the base load resistances 6 and 16, which need to be designed only on the basis of the saturation current of the switch choke coils. These resistances, of course, may be connected by switches 7 and 17; or, they may be permanently connected without such switches.

In Fig. 2 is shown an arrangement with three groups.

The secondary windings of the transformer are denoted at 1', 11', 21'. These are connected by a three-pole inter-phase transformer 2'. Each group has a base load resistance 6, 16, 26, which can be connected over the switch 7, 17, 27. The D.C. switches 5, 15, 25, which are disconnected as the load drops to the magnetizing current of the inter-phase transformer, are here located between the secondary windings 1', 11', 21' and the inter-phase transformer 2'.

Fig. 3 shows a similar arrangement, except that here the D.C. switches 5, 15 and 25 are installed in the star point of the inter-phase transformer 2''.

Referring to Fig. 4, a modification of the circuit of Fig. 1 has been illustrated wherein the D.C. switches are disconnected and the base load resistances are connected when the load current drops to the magnetizing current of the inter-phase transformer.

The inter-phase transformer 2 divides the secondary windings into two groups 1 and 11 having connected in parallel therewith through switches 17 and 7 the base load resistances 16 and 6, respectively. The loading on each secondary group may be different. Should the load of one group (group 11 for example) drop below half the magnetization current of the inter-phase transformer 2, the current through shunt 32 will open switch 15 and close the current supply to the coil of the electrically operated switch 7 to close the same and thus connect the base load resistance 6 in series with the group 11. The other group will still be conductive through switch 5 as long as the load current of that group is greater than half the magnetization of the inter-phase transformer 2. When the current of group 1 drops below this current value, the current through shunt 31 will open switch 5 and close switch 17 to place base resistance 16 in series with this group. The shunts 31 and 32 function similar to the shunts of direct-current measuring instruments and serve to reduce the primary current passing therethrough and only a small part thereof is fed to the operating coils of switches 5 and 15.

I claim:

1. A contact converter system comprising transformer means having primary windings fed from a low-ohm alternating-current network and secondary windings, said secondary windings being divided into at least two groups which in normal operation are controlled by inter-phase transformer means connected thereto, said inter-phase transformer means being connected to a direct-current main of a given polarity, choke coil means connected in series intermediate said secondary windings and one side of the contacts of said contact converter, the other side of said contacts being connected to a second direct current main of opposite polarity, each of said secondary winding groups having a direct-current switch connected in series therewith, each of said secondary winding groups and the choke coils and converter contacts associated therewith having also a separate base load resistance connected in parallel thereacross, said base load resistances having resistance values which are a function of the saturation current values of the choke coils.

2. A contact converter as defined in claim 1 wherein each of said direct-current switches is connected intermediate the converter contacts of the associated winding group and said second direct-current main.

3. A contact converter as defined in claim 1 wherein each of said direct-current switches is connected intermediate the associated secondary windings and the inter-phase transformer means.

4. A contact converter as defined in claim 1 wherein each of said direct-current switches is connected intermediate the inter-phase transformer means and said first direct-current main.

5. A contact converter as defined in claim 1 and further including auxiliary switches connected in series with each base load resistance, and means for opening the direct-current switches and for closing the auxiliary switches when the load current falls to a value near the value of the magnetizing current of the inter-phase transformer means.

References Cited in the file of this patent

UNITED STATES PATENTS

| 2,261,685 | Jordan | Nov. 4, 1941 |
| 2,340,098 | Zuhlke | Jan. 25, 1944 |
| 2,851,651 | Palmer | Sept. 9, 1958 |
| 2,883,602 | Kliesch | Apr. 21, 1959 |

FOREIGN PATENTS

| 756,927 | Germany | Nov. 16, 1953 |